(12) United States Patent
Hodsdon et al.

(10) Patent No.: US 12,396,397 B2
(45) Date of Patent: Aug. 26, 2025

(54) LINING PICKING CONTAINERS

(71) Applicant: Velcro IP Holdings LLC, Manchester, NH (US)

(72) Inventors: Jerry G. Hodsdon, Manchester, NH (US); Michael J. Perkins, Bedford, NH (US); Gregory Cole Winters, Leander, TX (US); Gregory K. Kopanski, Candia, NH (US); Joseph Mark Buhl, Menifee, CA (US)

(73) Assignee: Velcro IP Holdings LLC, Manchester, NH (US)

( * ) Notice: Subject to any disclaimer, the term of this patent is extended or adjusted under 35 U.S.C. 154(b) by 194 days.

(21) Appl. No.: 18/119,411

(22) Filed: Mar. 9, 2023

(65) Prior Publication Data
US 2023/0292668 A1 Sep. 21, 2023

Related U.S. Application Data

(60) Provisional application No. 63/321,122, filed on Mar. 18, 2022.

(51) Int. Cl.
*A01D 46/22* (2006.01)
*B65D 25/16* (2006.01)

(52) U.S. Cl.
CPC ............ *A01D 46/22* (2013.01); *B65D 25/16* (2013.01); *B65D 2231/001* (2013.01)

(58) Field of Classification Search
CPC .................................................... A01D 46/22
See application file for complete search history.

(56) References Cited

U.S. PATENT DOCUMENTS

| | | | |
|---|---|---|---|
| 496,024 A | | 4/1893 | Warner |
| 516,097 A | * | 3/1894 | Truitt ..................... A45C 11/22 |
| | | | 383/33 |
| 619,061 A | * | 2/1899 | Wilson ..................... B65F 1/12 |
| | | | 232/43.1 |
| 691,376 A | | 1/1902 | Harter |
| 1,458,162 A | * | 6/1923 | Whitenack ............. A01D 46/22 |
| | | | 232/43.1 |

(Continued)

FOREIGN PATENT DOCUMENTS

KR 10-2015-0106552 9/2015

OTHER PUBLICATIONS

International Preliminary Report on Patentability in International Appln. No. PCT/US2023/064016, mailed on Jul. 6, 2024, 8 pages.

(Continued)

*Primary Examiner* — Justin M Larson
(74) *Attorney, Agent, or Firm* — Fish & Richardson P.C.

(57) ABSTRACT

A picking container liner sleeve in the form of a sheet or tube of resin is placed inside a produce picking container and held in place by releasably engaging cooperative touch fasteners on the rim of the picking container and the upper end of the liner sleeve. The liner sleeve is sized to line the container in use to inhibit contact between picked produce and an interior surface of the produce picking container with the lower end of the produce picking container in a closed position, but to allow picked produce to fall through the lower end of the produce picking container with the lower end of the produce picking container in an open position.

20 Claims, 5 Drawing Sheets

(56) References Cited

U.S. PATENT DOCUMENTS

| | | | | |
|---|---|---|---|---|
| 1,875,585 | A | * | 9/1932 | Freimann ............... A01D 46/22 224/619 |
| 2,113,876 | A | | 4/1938 | Couch |
| 2,163,501 | A | * | 6/1939 | Speicher ............... A01D 46/22 383/41 |
| 2,586,974 | A | | 2/1952 | Merrion |
| 2,620,004 | A | | 12/1952 | Heitmeyer |
| 4,102,376 | A | | 7/1978 | Sharp |
| 4,925,071 | A | | 5/1990 | Fleming et al. |
| 5,201,446 | A | | 4/1993 | Martin |
| 5,328,267 | A | * | 7/1994 | Cuddy ............... B65D 88/1631 383/17 |
| 5,738,443 | A | * | 4/1998 | Renaud ............. B65D 88/1668 383/17 |
| 5,979,650 | A | | 11/1999 | Dull |
| 6,419,135 | B1 | | 7/2002 | Sali |
| 6,431,753 | B1 | * | 8/2002 | Rogers ............... B65D 88/1668 383/41 |
| 6,834,995 | B1 | * | 12/2004 | Stevens ............. B65D 88/1668 383/41 |
| 9,938,068 | B2 | | 4/2018 | Li |
| 2003/0024960 | A1 | * | 2/2003 | Greenstein ............. A45C 13/02 224/608 |
| 2005/0252941 | A1 | | 11/2005 | Alber et al. |
| 2005/0263556 | A1 | | 12/2005 | Labit et al. |
| 2006/0118558 | A9 | | 6/2006 | Carrillo |
| 2009/0194541 | A1 | | 8/2009 | Mayo |
| 2009/0294455 | A1 | | 12/2009 | Pruchnicki |
| 2009/0315350 | A1 | | 12/2009 | Allen |
| 2011/0084077 | A1 | | 4/2011 | James et al. |
| 2018/0319588 | A1 | | 11/2018 | Sturm |
| 2018/0344013 | A1 | | 12/2018 | Morales |

OTHER PUBLICATIONS

International Search Report and Written Opinion in International Appln. No. PCT/US2023/064016, mailed on Jul. 3, 2023, 15 pages.
pleasanthillgrain.com [online], "Liner for Fruit Picker's Bags & Buckets, Set of 8," available on or before Oct. 14, 2019, retrieved on Nov. 9, 2023, retrieved from URL <https://pleasanthillgrain.com/liner-for-fruit-picker-bags-buckets-set-of-8>, 5 pages.
sciessent.com [online], "Antimicrobial, Anti-Odor, and Water Repellent Technologies," available on or before Aug. 21, 2021, via Internet Archive: Wayback Machine URL <http://web.archive.org/web/20210821100654/https://www.sciessent.com/>, retrieved Nov. 9, 2023, URL <https://www.sciessent.com/>, 11 pages.
sfequip.com [online], "Plastic Bag Liners (100 Per Roll)," available on or before Sep. 18, 2021, via Internet Archive: Wayback Machine URL <https://web.archive.org/web/20210918171710/https://www.sfequip.com/plastic-bag-liners-100-per-roll/>, retrieved on Nov. 9, 2023, URL <https://www.sfequip.com/plastic-bag-liners-100-per-roll/>, 5 pages.

* cited by examiner

LINING PICKING CONTAINERS

TECHNICAL FIELD

This invention relates to lining produce picking containers, such as picking containers worn for field picking or otherwise gathering produce such as fruits and vegetables and transporting them to a collection point.

BACKGROUND

Much produce is still efficiently picked by hand, by workers who must carry the picked produce to a collection point in the field. For this purpose, picking containers are worn by such workers, supported by straps and carried generally on the front of the torso. To facilitate evacuation of the picked produce from the container at the collection point, often the lower ends of the containers are designed to be opened, allowing the produce to fall from the bottom of the container. Picking containers are durable equipment, designed to be used throughout one or more picking seasons. Over extended use, the interior surfaces of such containers can become soiled or contaminated. Some have suggested adding liners to such containers, to avoid contact between freshly-picked produce and a soiled interior picking container surface. Improvements in such liners, and how they are installed and used, are sought.

SUMMARY

Several aspects of the invention feature a method of lining a produce picking container. The method includes placing a liner sleeve inside a produce picking container, the container having a releasably closable lower end and an open upper end with a rim, the liner sleeve having an open upper end and lower end configured to allow produce to fall from the liner with the lower end of the liner unsupported by the lower end of the container. The upper end of the liner sleeve is secured to the rim of the produce picking container with releasable touch fasteners, a first part of the touch fasteners being carried on the liner sleeve and a cooperating second part of the touch fasteners being carried on the rim of the produce picking container. The liner sleeve is sized to line the produce picking container in use to inhibit contact between picked produce and an interior surface of the produce picking container with the lower end of the produce picking container in a closed position, while the lower end of the liner sleeve allows picked produce to fall through the lower end of the produce picking container with the lower end of the produce picking container in an open position.

In some embodiments, the lower end of the produce picking container includes a flap and a flap latch.

In some cases, the lower end of the liner sleeve is open.

In some examples the method also includes folding the lower end of the produce picking container together with the lower end of the liner sleeve, and securing the lower end of the liner sleeve in its folded position to inhibit picked produce from falling through the lower end of the produce picking container.

The liner sleeve is preferably of sufficient length to extend beyond the lower end of the produce picking container with the lower end of the produce picking container in an open position.

In some cases, the liner sleeve is fluid-impervious.

In some examples, the liner sleeve is circumferentially continuous, and is preferably seamless about its circumference.

In some other examples the liner sleeve is in sheet form, with opposite longitudinal edge regions. Placing the liner sleeve inside the produce picking container involves overlapping the longitudinal edge regions of the liner sleeve. In some cases, the liner sleeve is separated from an adjacent sheet of liner sleeve material prior to placing the liner sleeve inside the produce picking container. The liner sleeve may be separated along a perforation line, for example.

In some embodiments, the first part of the touch fasteners is or includes portions of an array of male touch fastener elements extending about the upper end of the liner sleeve on an outer surface of the liner sleeve. In some cases, the array of male touch fastener elements is continuous about the upper end of the liner sleeve. The cooperating second part of the touch fasteners may be or include one or more patches of hook-engageable loop fastener material secured about the rim of the produce picking container, such as to an outer surface of the produce picking container.

In some embodiments, the produce picking container includes a carrying strap secured to the rim of the produce picking container. Securing the upper end of the liner sleeve to the rim of the produce picking container may involve positioning a slit in the upper end of the liner sleeve to accommodate the carrying strap.

In some cases, the produce picking container is or features a flexible pouch with a flexible rim.

The rim of the produce picking container may be rigid.

In some embodiments, the produce picking container is adapted to be worn by a produce picker. Securing the upper end of the liner sleeve to the rim of the produce picking container involves: first securing a first portion of the upper end of the sleeve to a portion of the rim of the produce picking container on a side of the produce picking container adapted to face the produce picker, and then securing a second portion of the upper end of the liner sleeve to a portion of the rim of the produce picking container on a side of the produce picking container adapted to face away from the produce picker.

Securing the first portion of the upper end of the sleeve to a portion of the rim of the produce picking container on a side of the produce picking container adapted to face the produce picker may include securing the first portion of the upper end of the sleeve to an inner surface of the rim of the produce picking container, and securing a second portion of the upper end of the liner sleeve to a portion of the rim of the produce picking container on a sider of the produce picking container adapted to face away from the produce picker may include securing a second portion of the upper end of the liner sleeve to an outer surface of the rim of the produce picking container.

In some cases, the liner sleeve defines, prior to being placed inside the produce picking container, slits extending a limited distance down the sleeve from the upper end of the sleeve and spaced to enable folding of the second portion of the upper end of the liner sleeve with respect to the first portion of the upper end of the sleeve. The slits may each feature or be in the form of discontinuous lines of perforation.

In some cases the liner sleeve, including the first part of the touch fasteners, is formed of polyethylene.

In some cases, the liner is treated to protect against different pathogens/bacteria/fungus, etc. For example, antimicrobial materials like silver or copper particles can be included in the resin forming the liner body, or the liner may be treated with an antimicrobial coating or a hydrophilic coating.

Another aspect of the invention features, in combination, a wearable produce picking container defining a pouch having a releasably closable lower end and an open upper end with a rim, and a liner sleeve disposed within the pouch to inhibit contact between picked produce and an interior surface of the produce picking container. The liner sleeve has an open upper end releasably secured to the rim of the pouch and an open lower end. The upper end of the liner sleeve is secured to the rim of the pouch with releasable touch fasteners, a first part of the touch fasteners being carried on the liner sleeve and a cooperating second part of the touch fasteners being carried on the rim of the pouch, while the open lower end of the liner sleeve allows picked produce to fall through the lower end of the pouch with the lower end of the pouch in an open position.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
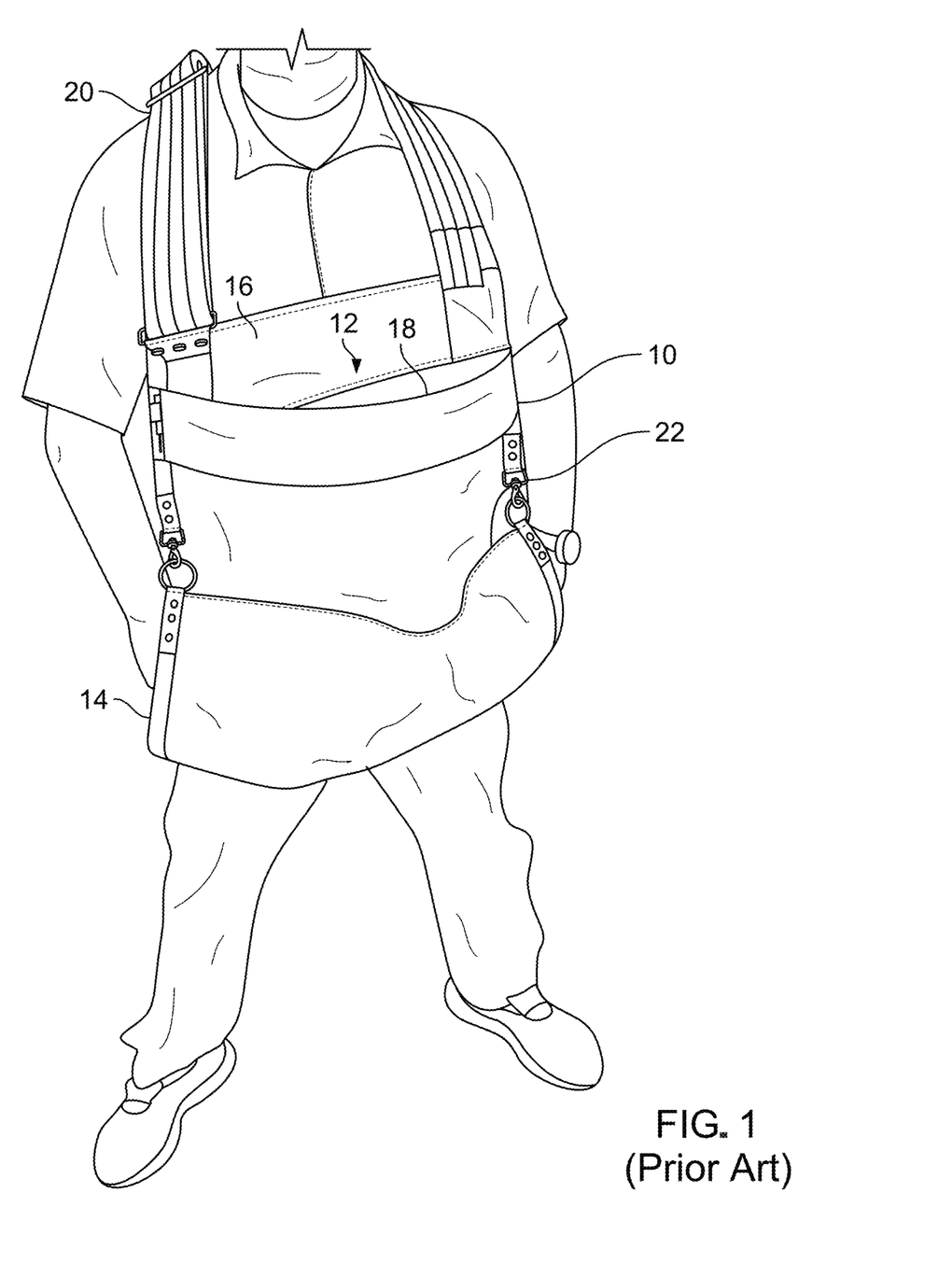
FIG. 1 shows an unlined picking container being worn for use.

Referring first to FIG. 1, a wearable produce picking container 10 defines a pouch 12 having a releasably closable lower end 14 and an open upper end 16 with a rim 18. Straps 20 extend from the upper end of the pouch to encircle a wearer's neck and/or arms to secure the picking container to the user during use, with the picking container overlying the front of the user's torso and with the open end of the pouch accessible for the user to place picked produce in the pouch during picking. The pouch of the picking container is formed of a sturdy canvas material. The lower end of the pouch is folded upward and held in this folded condition by two releasable latches 22, one on each side.

When the pouch is full, the wearer can conveniently dump its contents into a bushel or other produce collection bin or onto a sorting surface by simply releasing the two latches 22 to allow the lower end of the pouch to unfold and permit the produce to fall through the open bottom of the pouch.

Figure 2:
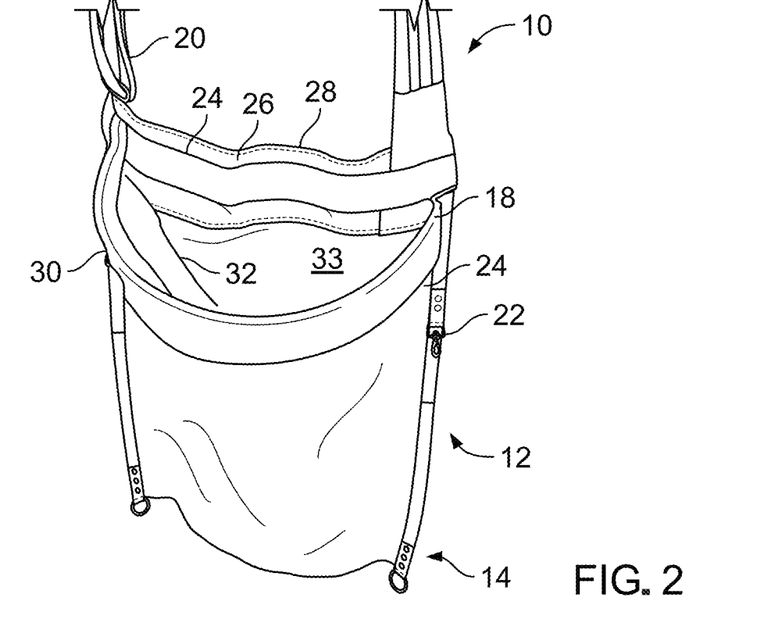
FIG. 2 shows a picking container modified to accept a liner sleeve.

FIG. 2 shows the picking container 10 modified to include loop fastener strips 24, with one of the strips sewn or otherwise permanently bonded to the inner surface 26 of the portion 28 of the rim of the container adapted to face the wearer or produce picker and the other of the strips sewn to the outer surface 30 of a portion 32 of the rim on a side of the container adapted to face away from the produce picker. In this arrangement, both hook fastener strips 24 face forward during use. The lower end of the pouch of the picking container is shown in an unfolded or open position, with the latches 22 released. In this view, the inner surface 33 of the pouch is exposed for contact with picked produce placed in the pouch.

Figure 3:
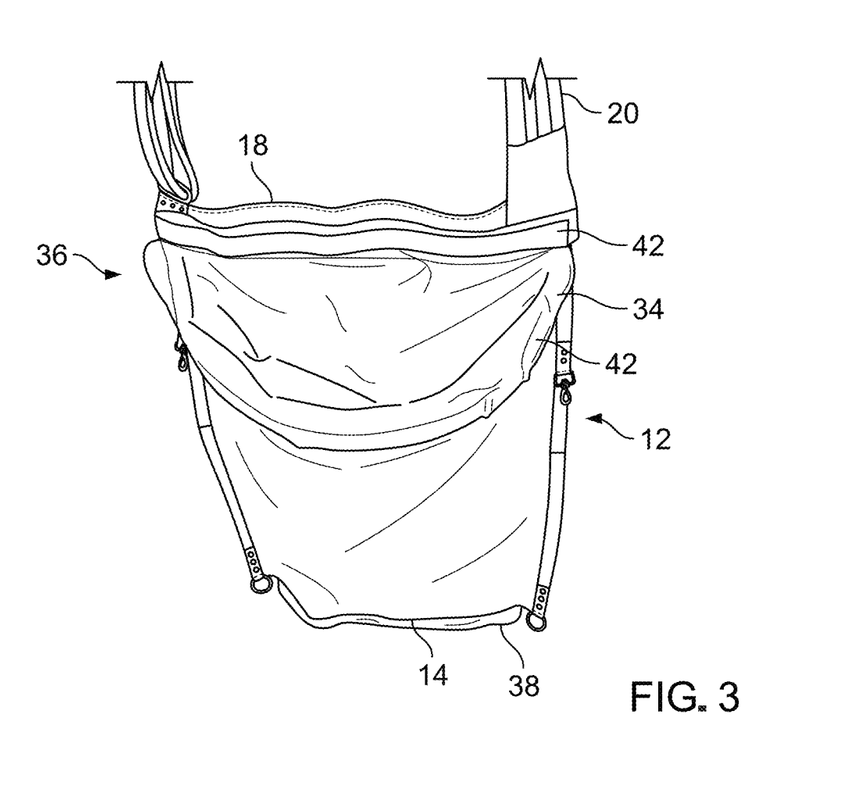
FIG. 3 shows the picking container of FIG. 2 in combination with a liner sleeve, with the bottom of the container in an open position.

Referring next to FIG. 3, a liner sleeve 34 has been placed within the pouch 12 to inhibit contact between any picked produce and the interior surface of the produce picking container. The liner sleeve has an open upper end 36 releasably secured to the rim 18 of the pouch, and has an open lower end 38 extending slightly below the lower end 14 of the pouch to allow picked produce to fall through the lower end of the pouch with the lower end 14 of the pouch in an open position as shown. The upper end 36 of the liner sleeve is secured to the rim of the pouch with releasable touch fasteners formed by the loop fastener strips 24 permanently attached to the rim and the hook fastener strips 42 that are part of the liner sleeve. In other examples, the positions of the hook and loop strips are reversed, or the touch fastening is formed by two self-engaging hook strips. In this example, both hook fastener strips 42 are disposed on outer surfaces of the liner sleeve, the front portion of which is folded over the rim to secure one of the hook fastener strips 42 to the outer surface of the front portion of the rim, while the rear portion of the upper end of the liner sleeve is not folded but extends upward to engage the loop fastener strip on the inner surface of the rear portion of the rim (i.e., the portion nearest the wearer). Short vertical slits 44 or tear lines (FIG. 4) at the upper edge of the liner sleeve facilitate the folding of only the forward portion of the upper end of the liner sleeve. These slits are positioned to align with the lateral edges of the pouch and are a length corresponding to the width of liner sleeve needed to engage the forward hook fastener strip with the loop fastener strip on the outer surface of the pouch rim.

Figure 4:
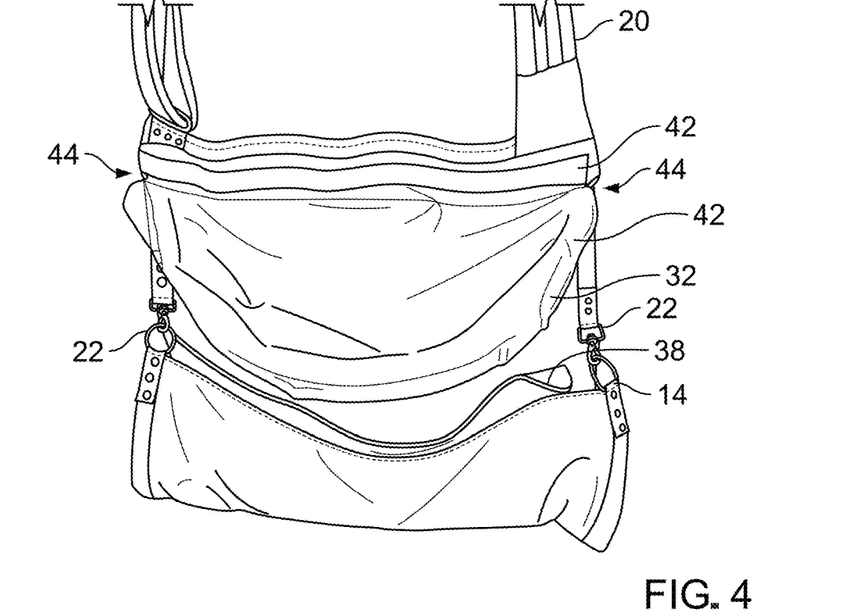
FIG. 4 shows the picking container and liner of FIG. 3, with the bottom of the container in a closed position.

FIG. 4 shows the same picking container and liner sleeve as in FIG. 3, but with the lower end 14 of the pouch and the lower end 38 of the liner sleeve folded upward and held in the illustrated folded condition by the latches 22.

Figure 5:
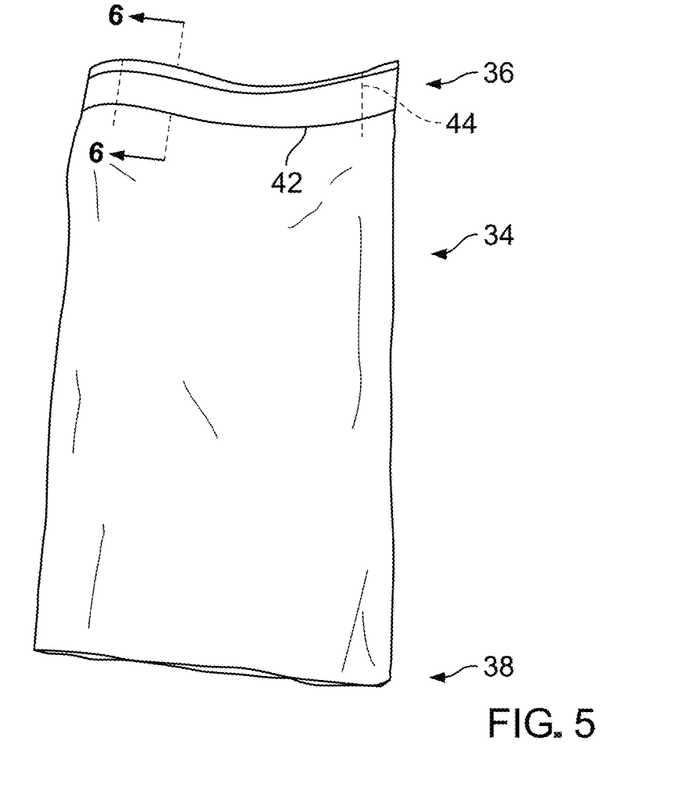
FIG. 5 is a front view of a first embodiment of a liner sleeve, in the form of a tube.

Referring next to FIG. 5, liner sleeve 34 is a tube having open upper end lower ends but is otherwise impermeable. The body of the tube is formed of 0.03 to 0.2 millimeter thick polyethylene sheet. At the upper end 36 of the liner sleeve, hook fastener strips 42 are bonded to both the front and back sides of the sleeve. In this example, the hook fastener strips 42 are formed as a single continuous strip of polyethylene resin subsequently heat-bonded to the polyethylene sheet forming the body of the tube prior to forming the slits 44 through both the strip and the tube, severing the strip into separate hook fastener strips 42. Alternatively, the hook fastener strips may be integrally formed with the sheet of resin forming the body of the tube, or bonded by adhesive or other means. Slits may alternatively be formed as perforated lines for ready tearing during liner installation. The hook fastener strip may be bonded along an edge of a flat sheet of polyethylene material and then the sheet folded and heat sealed along one edge to form the tube, or both sides of the sleeve may be heat sealed, if preferred for converting purposes. Preferably, the entire liner sleeve 34, including the hook fastener strips 42, is of a single resin base, such as polyethylene, facilitating recycling of the entire liner sleeve following use. In this example the lower end of the liner sleeve is open. In another example, the lower end of a disposable liner sleeve is closed but by a weak seam, such as a perforation, that is sufficiently weak to rupture when the lower end of the container is opened while the liner sleeve is filled with produce. The lower end of the liner may be formed with tapered sides in order to slow the movement of produce during the opening and dumping stage, reducing bruising and produce damage.

Figure 6:
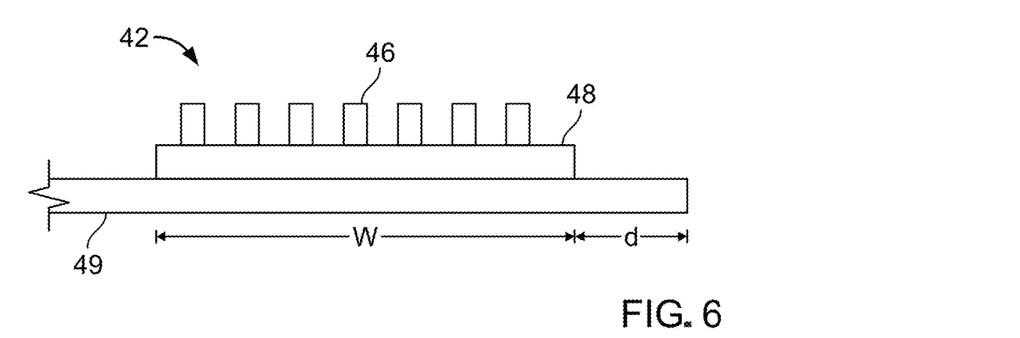
FIG. 6 is an enlarged cross-sectional view, taken along line 6-6 in FIG. 5, through the hook fastener strip.
Figure 7:
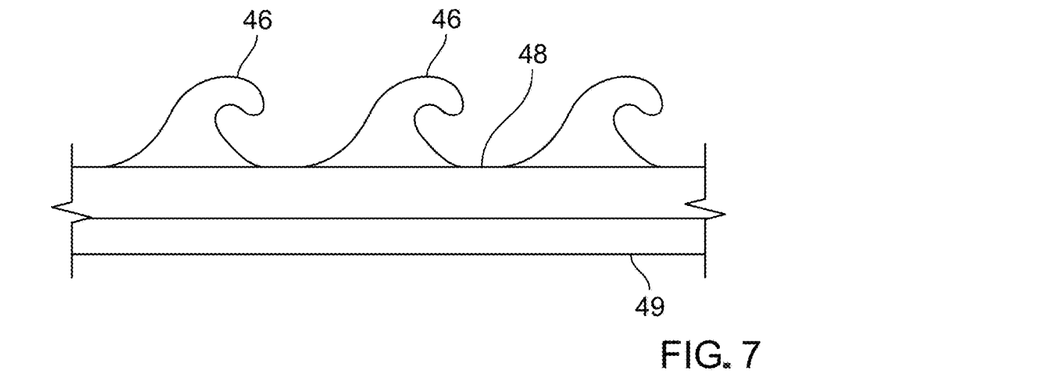
FIG. 7 is an enlarged side view of a hook fastener strip.

As shown in FIGS. 6 and 7, the hook fastener strips 42 in this example have a width W of millimeters and are spaced a distance of about 6 millimeters from the upper edge of the tube. The hook fastener strips 42 have arrays of discrete hook-shaped fastening elements 46 having stems of polyethylene resin extending contiguously from a polyethylene base strip 48 that is about 0.1 millimeter thick. The hook fastener strips may alternatively be secured to the polymer sheet of the tube body 49 with an adhesive or ultrasonic welds, or may be formed with the sheet. The fastening elements 46 can be of any shape appropriate to releasably engage fibers of the loop fastener strips of the picking container. In one example, the hook fastener strip is a #832 polyethylene hook strip available from Velcro USA Inc. of Manchester, NH, and the loop fastener strips are 3610 knit loop, also available from Velcro USA Inc. Preferably the male fastener elements are arranged in a density of between about 50 and 3000 fastener elements per square centimeter and the loop material is capable of at least 500 engagement cycles with the hook fastener strips without significant loop damage. In some cases the hook fastener strip arranged to engage with the back side of the picking container is formed of resin of a different color than resin forming the hook fastener strip arranged to engage with the front side of the picking container, as a visual aid to proper installation. The hook lanes on the front and back sides of the liner may have different hook geometry or width. The color of the hook lane may match that of the loop strip to guide installation. In another embodiment, the hook strip does not extend continuously from the slits, to aid installation to various size bags.

Figure 8:
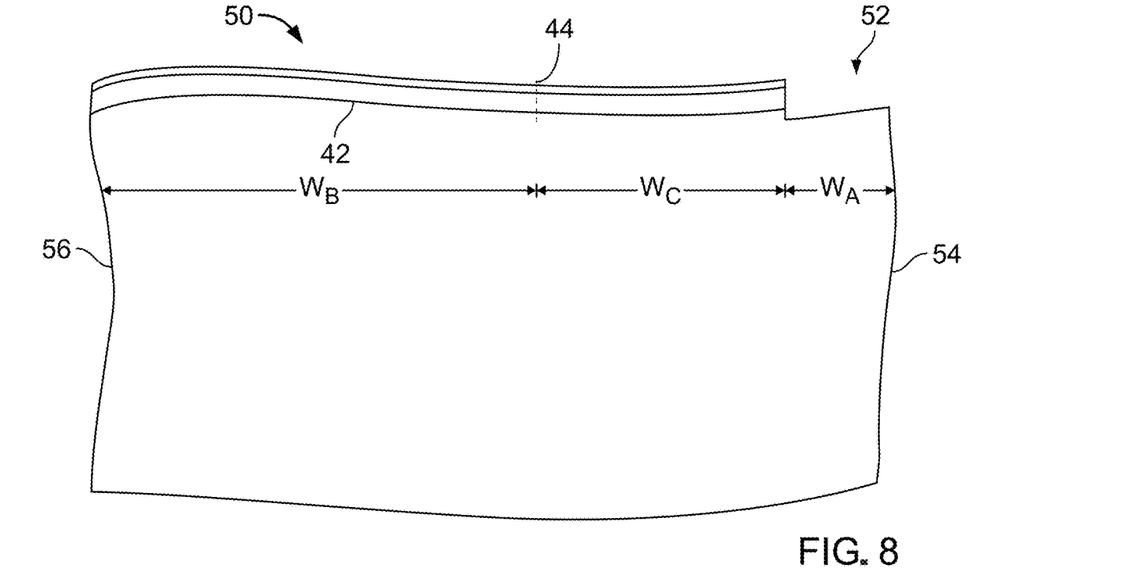
FIG. 8 is a front view of a second embodiment of a liner sleeve in the form of a flat sheet.

The liner sleeve may take other forms. For example, rather than being inserted as a tube, the liner sleeve may be formed as a flat sheet that is folded into an overlapping tube during insertion. FIG. 8 shows a liner sleeve sheet 50 that consists of a flexible sheet of polyethylene with a hook fastener strip 42 bonded adjacent one edge. One slit 44 is formed through the fastener strip and underlying polyethylene sheet, spaced from a notch 52 at one corner of the sheet. To install liner sleeve sheet 50 into a picking container pouch to form a liner sleeve, the sheet is loosely folded along vertical lines and inserted downward into the pouch with the portion of the hook fastener strip 42 between the slit and the notch generally extending between the lateral edges of the pouch and facing the rear of the pouch, the slit aligned with a right end of the pouch and the edge of the notch aligned with the left end of the pouch. The portion of hook fastener strip 42 between the slit and the notch is then secured to the loop fastener strip facing the inside of the pouch, with the rest of the liner sleeve sheet wrapping around the inside of the pouch. The portion of the liner sleeve sheet beneath notch 52, of a width $W_A$, is wrapped around the left portion of the inside of the front of the pouch but not folded over the rim, such that vertical sleeve sheet edge 54 is against the inside surface of the front of the pouch. The unsecured portion of the liner sleeve sheet extending rightward (with respect to the pouch wearer) from the slit, of width $W_B$, is wrapped around to line the entire front of the pouch, over lapping the portion of width $W_A$ with vertical sheet edge 56 generally disposed at the leftmost end of the pouch. The slit 44 is then opened and the upper edge of the liner sleeve sheet is then folded forward over the rim across the entire front of the pouch and its length of hook fastener strip 42 releasably secured to the loop fastener strip on the outer surface of the pouch rim. Slit 44 can be formed by opening any one of a number of perforated tear lines, enabling the user to select the one that best suits the picking bag geometry. The portion of sleeve sheet of width $W_B$ lies against the inside surface of the rear of the pouch. The amount of overlap at the vertical ends of the liner sleeve sheet (i.e., width $W_A$) should be selected in relation to the stiffness of the liner sleeve sheet and the general properties of the produce to be picked, to avoid shifting of the liner sleeve material enough to expose the inner surface of the pouch to the produce, either during picking or during pouch evacuation. In this manner the liner sleeve sheet effectively forms a liner sleeve as properly installed. With the liner sleeve installed, the lower end of the picking container can be folded up with the lower end of the liner sleeve and secured to contain produce, as in the previous example.

Whether configured as a tube or a foldable sheet, the liner sleeve may be either configured for multiple uses and decontamination, or configured to be disposed or recycled after one use. The liner may include antimicrobial agents, such as a film impregnated with Microban™ or including silver or zeolite additives. The stiffness of the tube or sheet may be selected to help hold the pouch in an open condition, or for maximum flexibility while avoiding tears or punctures, such as from stems.

Figure 9:
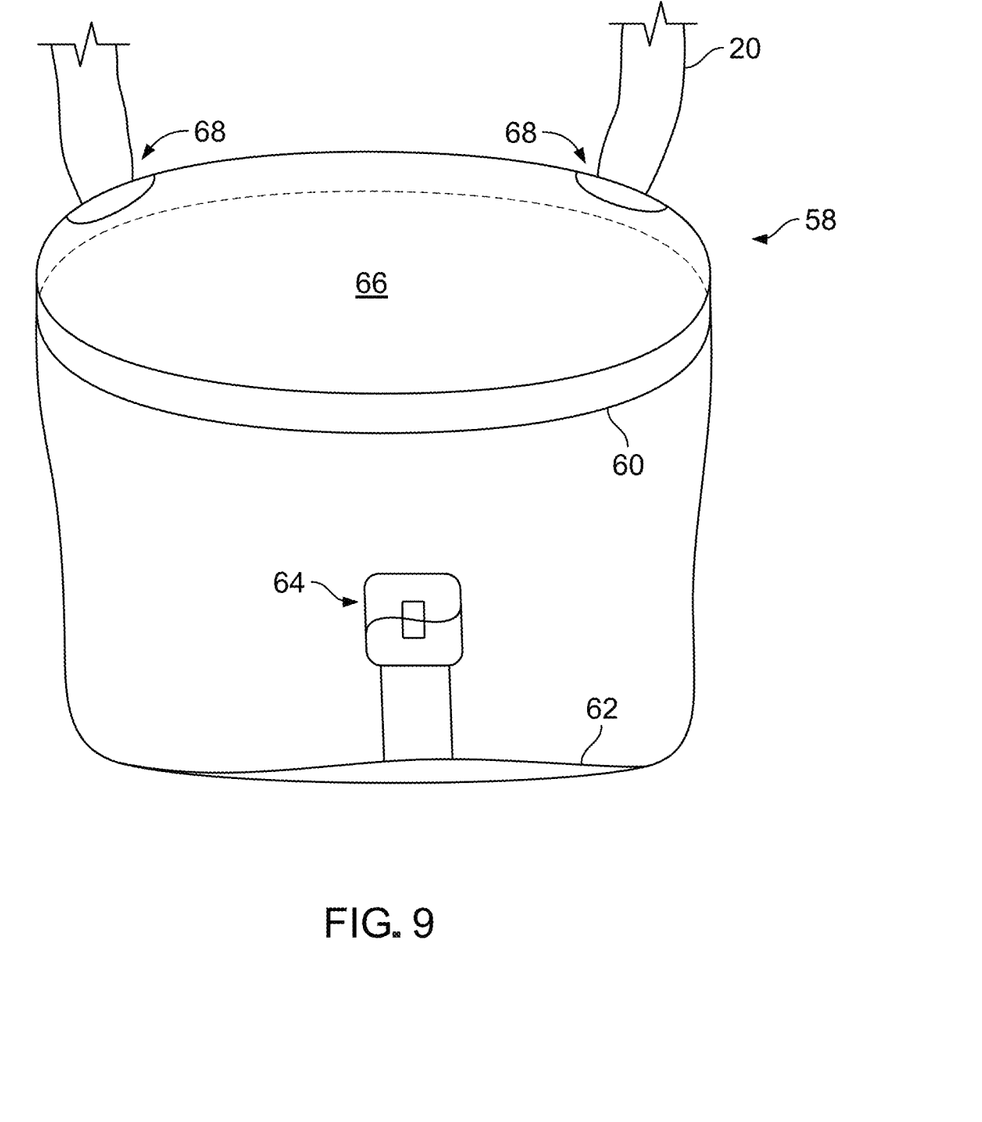
FIG. 9 is a front view of a second embodiment of lined picking container.

Liner sleeves may be fashioned for picking containers of other forms. For example, FIG. 9 shows a picking container 58 of a more rigid construction, with a semi-rigid rim 60 about its upper opening and a flexible flap 62 held up to cover the lower end of the container by a flap latch 64. In this embodiment, liner sleeve 66 (whether as a tube or sheet) has an upper edge that is folded outward over both the front and back segments of the rim, to engage loop fastener strips on the outside of the rim on both the front and back of the container. Cutouts 68 are formed in the liner and spaced to accommodate the straps 20 extending from the upper end of the container. The lower end of the liner sleeve (not shown) may be folded up within the container to cover the bottom of the container, but otherwise unrestricted so as to open under the weight of produce when the flap latch 64 is released.

While a number of examples have been described for illustration purposes, the foregoing description is not intended to limit the scope of the invention, which is defined by the scope of the appended claims. There are and will be other examples and modifications within the scope of the following claims.

What is claimed is:

1. A method of lining a produce picking container, the method comprising:

placing a liner sleeve inside a produce picking container, the container having a releasably closable lower end and an open upper end with a rim, the liner sleeve having an open upper end and lower end configured to allow produce to fall from the liner with the lower end of the liner unsupported by the lower end of the container;

securing the upper end of the liner sleeve to the rim of the produce picking container with releasable touch fasteners, a first part of the touch fasteners being carried on the liner sleeve and a cooperating second part of the touch fasteners being carried on the rim of the produce picking container;

wherein the liner sleeve is sized to line the produce picking container in use to inhibit contact between picked produce and an interior surface of the produce picking container with the lower end of the produce picking container in a closed position, while the lower end of the liner sleeve allows picked produce to fall through the lower end of the produce picking container with the lower end of the produce picking container in an open position;

wherein the liner sleeve is in sheet form, with opposite longitudinal edge regions; and wherein placing the liner sleeve inside the produce picking container comprises overlapping the longitudinal edge regions of the liner sleeve;

further comprising separating the liner sleeve from an adjacent sheet of liner sleeve material, prior to placing the liner sleeve inside the produce picking container.

2. The method of claim 1, wherein the lower end of the produce picking container comprises a flap and a flap latch.

3. The method of claim 1, wherein the lower end of the liner sleeve is open.

4. The method of claim 1, further comprising:
folding the lower end of the produce picking container together with the lower end of the liner sleeve, and
securing the lower end of the liner sleeve in its folded position to inhibit picked produce from falling through the lower end of the produce picking container.

5. The method of claim 1, wherein the liner sleeve is of sufficient length to extend beyond the lower end of the produce picking container with the lower end of the produce picking container in an open position.

6. The method of claim 1, wherein the liner sleeve is fluid-impervious.

7. The method of claim 1, wherein the liner sleeve is circumferentially continuous.

8. The method of claim 1, wherein the produce picking container comprises a carrying strap secured to the rim of the produce picking container, and wherein securing the upper end of the liner sleeve to the rim of the produce picking container comprises positioning a slit in the upper end of the liner sleeve to accommodate the carrying strap.

9. The method of claim 1, wherein the rim of the produce picking container is rigid.

10. The method of claim 1, wherein the produce picking container is adapted to be worn by a produce picker; and wherein securing the upper end of the liner sleeve to the rim of the produce picking container comprises: first securing a first portion of the upper end of the liner sleeve to a portion of the rim of the produce picking container on a side of the produce picking container adapted to face the produce picker, and then securing a second portion of the upper end of the liner sleeve to a portion of the rim of the produce picking container on a side of the produce picking container adapted to face away from the produce picker.

11. The method of claim 1, wherein the first part of the touch fasteners comprises portions of an array of male touch fastener elements extending about the upper end of the liner sleeve on an outer surface of the liner sleeve.

12. The method of claim 11, wherein the array of male touch fastener elements is continuous about the upper end of the liner sleeve.

13. The method of claim 11, wherein the cooperating second part of the touch fasteners comprises one or more patches of hook-engageable loop fastener material secured about the rim of the produce picking container.

14. A method of lining a produce picking container, the method comprising:

placing a liner sleeve inside a produce picking container, the container having a releasably closable lower end and an open upper end with a rim, the liner sleeve having an open upper end and lower end configured to allow produce to fall from the liner with the lower end of the liner unsupported by the lower end of the container;

securing the upper end of the liner sleeve to the rim of the produce picking container with releasable touch fasteners, a first part of the touch fasteners being carried on the liner sleeve and a cooperating second part of the touch fasteners being carried on the rim of the produce picking container;

wherein the liner sleeve is sized to line the produce picking container in use to inhibit contact between picked produce and an interior surface of the produce picking container with the lower end of the produce picking container in a closed position, while the lower end of the liner sleeve allows picked produce to fall through the lower end of the produce picking container with the lower end of the produce picking container in an open position;

wherein the produce picking container is adapted to be worn by a produce picker; and wherein securing the upper end of the liner sleeve to the rim of the produce picking container comprises: first securing a first portion of the upper end of the liner sleeve to a portion of the rim of the produce picking container on a side of the produce picking container adapted to face the produce picker, and then securing a second portion of the upper end of the liner sleeve to a portion of the rim of the produce picking container on a side of the produce picking container adapted to face away from the produce picker; and wherein securing the first portion of the upper end of the liner sleeve to a portion of the rim of the produce picking container on a side of the produce picking container adapted to face the produce picker comprises securing the first portion of the upper end of the liner sleeve to an inner surface of the rim of the produce picking container, and wherein securing a second portion of the upper end of the liner sleeve to a portion of the rim of the produce picking container on a sider of the produce picking container adapted to face away from the produce picker comprises securing a second portion of the upper end of the liner sleeve to an outer surface of the rim of the produce picking container.

15. The method of claim 14, wherein the liner sleeve defines, prior to being placed inside the produce picking container, slits extending a limited distance down the liner sleeve from the upper end of the sleeve and spaced to enable folding of the second portion of the upper end of the liner sleeve with respect to the first portion of the upper end of the liner sleeve.

16. A method of lining a produce picking container, the method comprising:

placing a liner sleeve inside a produce picking container, the container having a releasably closable lower end and an open upper end with a rim, the liner sleeve having an open upper end and lower end configured to allow produce to fall from the liner with the lower end of the liner unsupported by the lower end of the container;

securing the upper end of the liner sleeve to the rim of the produce picking container with releasable touch fasteners, a first part of the touch fasteners being carried on the liner sleeve and a cooperating second part of the touch fasteners being carried on the rim of the produce picking container;

wherein the liner sleeve is sized to line the produce picking container in use to inhibit contact between picked produce and an interior surface of the produce picking container with the lower end of the produce picking container in a closed position, while the lower end of the liner sleeve allows picked produce to fall through the lower end of the produce picking container with the lower end of the produce picking container in an open position; and wherein the produce picking container comprises a carrying strap secured to the rim of the produce picking container, and wherein securing the upper end of the liner sleeve to the rim of the produce picking container comprises positioning a slit in the upper end of the liner sleeve to accommodate the carrying strap.

17. The method of claim 16, wherein the lower end of the produce picking container comprises a flap and a flap latch.

18. The method of claim 16, wherein the lower end of the liner sleeve is open.

19. The method of claim 16, wherein the liner sleeve is fluid-impervious.

20. The method of claim 16, wherein the liner sleeve is circumferentially continuous.

* * * * *